United States Patent
Saegusa et al.

[11] Patent Number: 5,921,449
[45] Date of Patent: Jul. 13, 1999

[54] SPARE TIRE COVER FOR AUTOMOBILES

[75] Inventors: Hiroyuki Saegusa, Saitama; Shinji Aoki, Tochigi, both of Japan

[73] Assignees: Honda Gikenkogyo Kabushiki Kaisha, Tokyo, Japan; TS Tech Co., Ltd., Asaka, Japan

[21] Appl. No.: 08/995,011

[22] Filed: Dec. 19, 1997

[30] Foreign Application Priority Data

Dec. 26, 1996 [JP] Japan .................................. 8-348017

[51] Int. Cl.$^6$ .................................................. B62D 43/02
[52] U.S. Cl. .................... 224/42.2; 224/42.12; 296/37.3; 206/304.1; 150/154
[58] Field of Search ............................... 224/42.12, 42.2; 296/37.3; 206/304, 304.1; 150/154, 166, 167; D12/202, 204, 210, 211, 213

[56] References Cited

U.S. PATENT DOCUMENTS

| | | | |
|---|---|---|---|
| 1,658,696 | 2/1928 | Walrath | 206/304 |
| 1,718,969 | 7/1929 | Lockwood | 206/304 |
| 1,830,819 | 11/1931 | Wishmeier | 206/304.1 |
| 1,888,777 | 11/1932 | Stein | 206/304.1 |
| 2,102,469 | 12/1937 | Lyon | 224/42.2 |
| 4,516,706 | 5/1985 | Nichaus | 224/42.2 |
| 4,932,573 | 6/1990 | Flint | 224/42.2 |
| 5,076,477 | 12/1991 | Colgan | 224/42.2 |
| 5,402,922 | 4/1995 | Jordan et al. | 224/42.2 |

FOREIGN PATENT DOCUMENTS

| | | | |
|---|---|---|---|
| 361631 | 4/1990 | European Pat. Off. | 224/42.2 |
| 402092787 A | 4/1990 | Japan | 224/42.2 |

*Primary Examiner*—Gregory M. Vidovich
*Attorney, Agent, or Firm*—Armstrong, Westerman, Hattori, McLeland, & Naughton

[57] ABSTRACT

A spare tire cover covering a spare tire supported on a bracket fixed on a rear gate or the like of a vehicle includes a first sheet portion having an opening into which the bracket is inserted and for covering one side surface of the spare tire, a second sheet portion covering an outer peripheral surface of the spare tire, and a third sheet portion for covering another side surface of the spare tire. The opening is biased in a shrinking direction by means of elastic bands accommodated at a fringe and can be opened at three slits extending in a radial direction. The spare tire cover is positioned in a rotational direction by contacting a straight portion formed on an upper fringe of the opening with a straight spare tire cover supporting portion horizontally formed on an upper surface of the bracket. Thus, a tilt of a logotype or the like printed on the spare tire cover can be prevented.

2 Claims, 6 Drawing Sheets

SPARE TIRE COVER FOR AUTOMOBILES

BACKGROUND OF THE INVENTION

1. Field of the Invention

The present invention relates to a spare tire cover for covering a spare tire supported on a bracket mounted on a rear gate, for example, of an automobile.

2. Description of the Related Art

Spare tire covers for covering a spare tire, supported on the rear gate of a vehicle such as a recreational vehicle, include a molded hard cover formed of a rigid synthetic resin and a soft cover formed of a soft sheet such as a vinyl leather.

The hard cover has a first half member fixed on the bracket mounted on the rear gate and a second half member detachably fixed on the outside of the first half member. The spare tire mounted on the bracket is covered with the first and second half members. This hard cover has a good appearance, but is costly.

The soft cover is made by integrally sewing soft sheets. The soft cover is attached so as to cover the spare tire fixed on the bracket while the opening which has a peripheral fringe including a rubber or the like being stretched.

The soft cover can be manufactured at low costs because of its simple structure. However, there has been the disadvantage in that since it is difficult to position the soft cover onto a spare tire, a logotype printed on the surface of the soft cover is tilted or wrinkled so that the beauty of it is spoiled.

SUMMARY OF THE INVENTION

The present invention is made to overcome the above-mentioned problem. An object of the present invention is to provide a soft cover for spare tires which can provide good appearance.

In order to achieve the above-mentioned object, according to a first aspect of the invention, a spare tire cover is attached onto a spare tire supported on a bracket mounted on an outer wall surface of a vehicle. The spare tire cover covers the spare tire while the bracket is fitted into an opening formed at a center of the spare tire cover. In this case, since a positioning portion formed in the opening comes in contact with an upper surface of the bracket so as to position the spare tire cover in the rotational direction, the spare tire cover can always be mounted in a fixed attitude and with a good appearance.

According to a second aspect of the invention, the straight positioning portion formed at the opening of the spare tire cover contacts with a straight spare tire cover supporting portion horizontally formed on the upper surface of a bracket. Hence, the bracket is positively in contact with the opening so that the spare tire cover is accurately positioned.

According to a third aspect of the invention, since slits allow the opening to be easily widened, the spare tire cover can be easily attached and removed. Since a resilient member biases the opening in a shrinking direction, the spare tire cover is kept attached stably. Moreover, since only a simple downward tension acts on the portion of the spare tire cover above the positioning portion, no wrinkle occurs at the portion, thus improving the appearance.

BRIEF DESCRIPTION OF THE DRAWINGS

An embodiment of the present invention will be described below with reference to the attached drawings, of which.

DETAILED DESCRIPTION OF THE PREFERRED EMBODIMENTS

Figure 1:
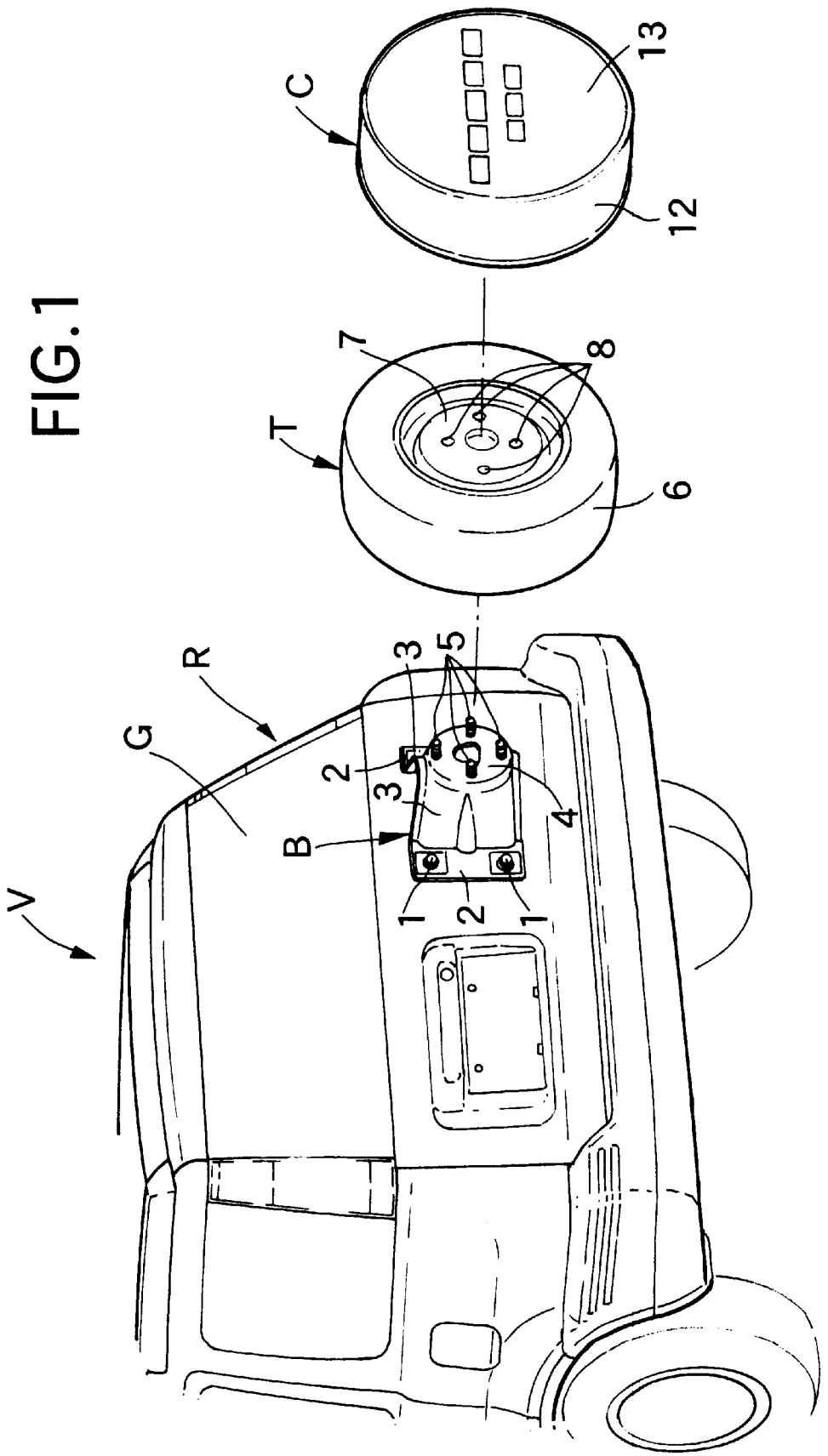
FIG. 1 is a perspective view showing the rear portion of an automobile.
Figure 2:
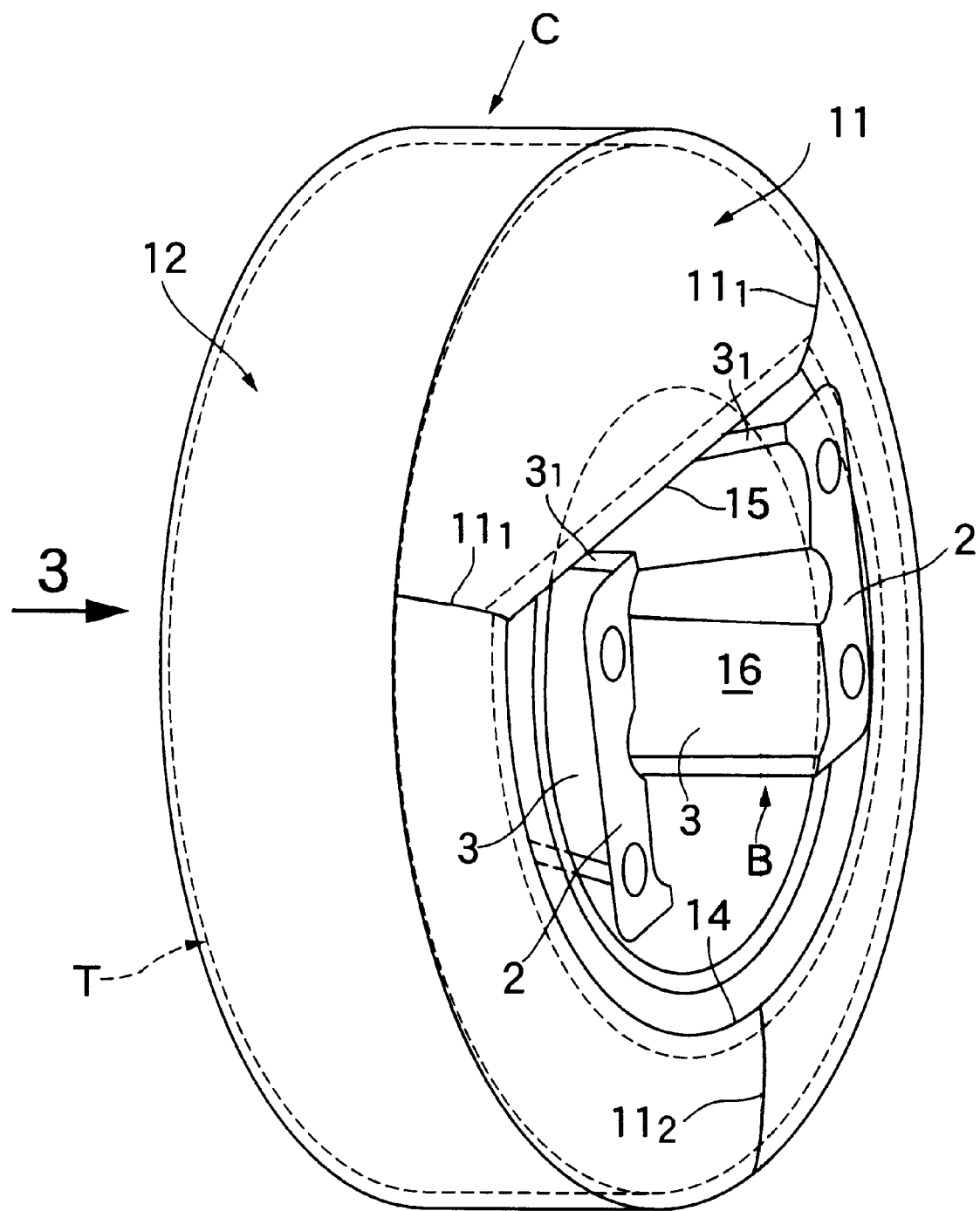
FIG. 2 is a perspective view showing a spare tire cover attached.
Figure 3:
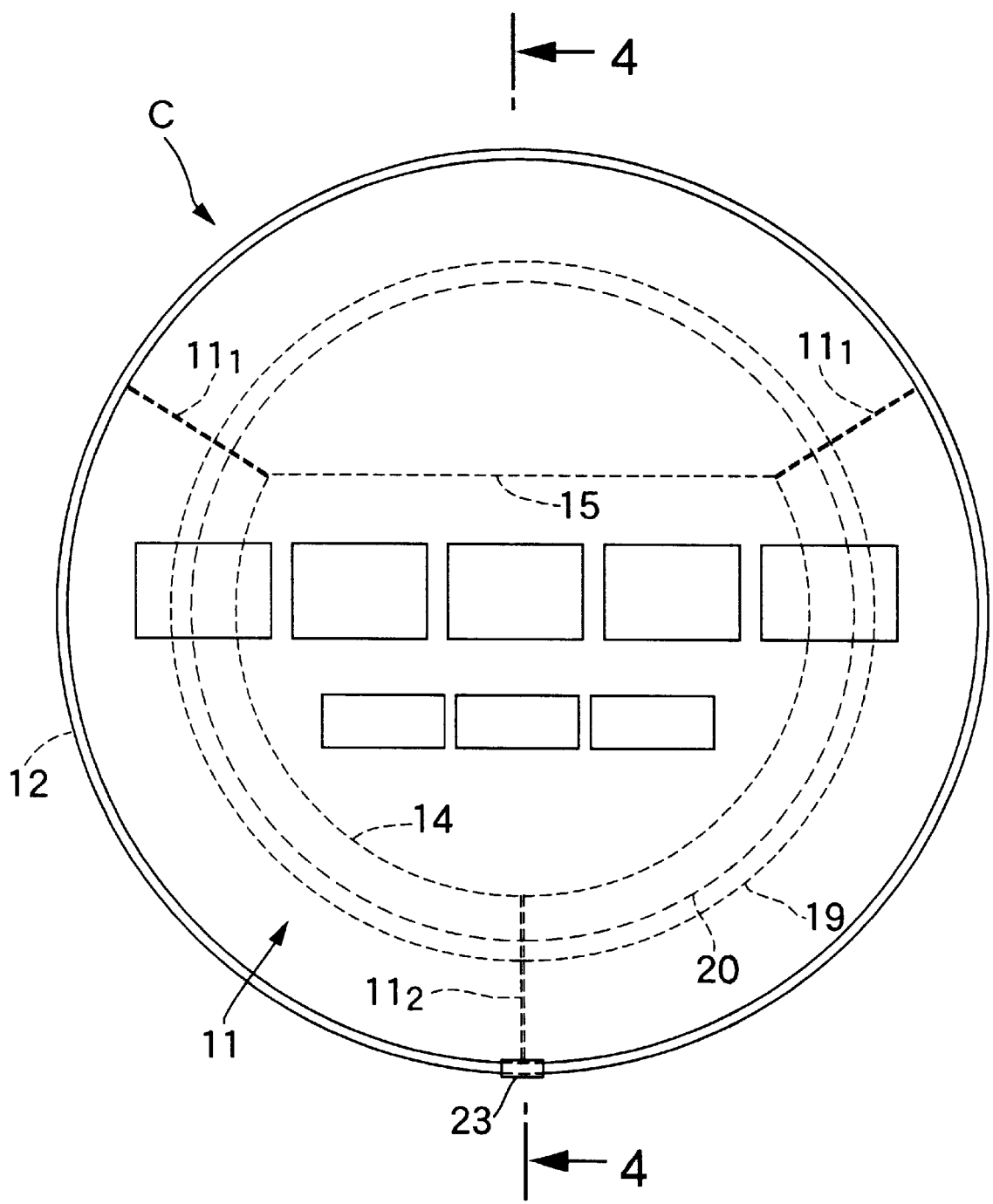
FIG. 3 is a view viewed in the arrow 3 direction in FIG. 2.
Figure 4:
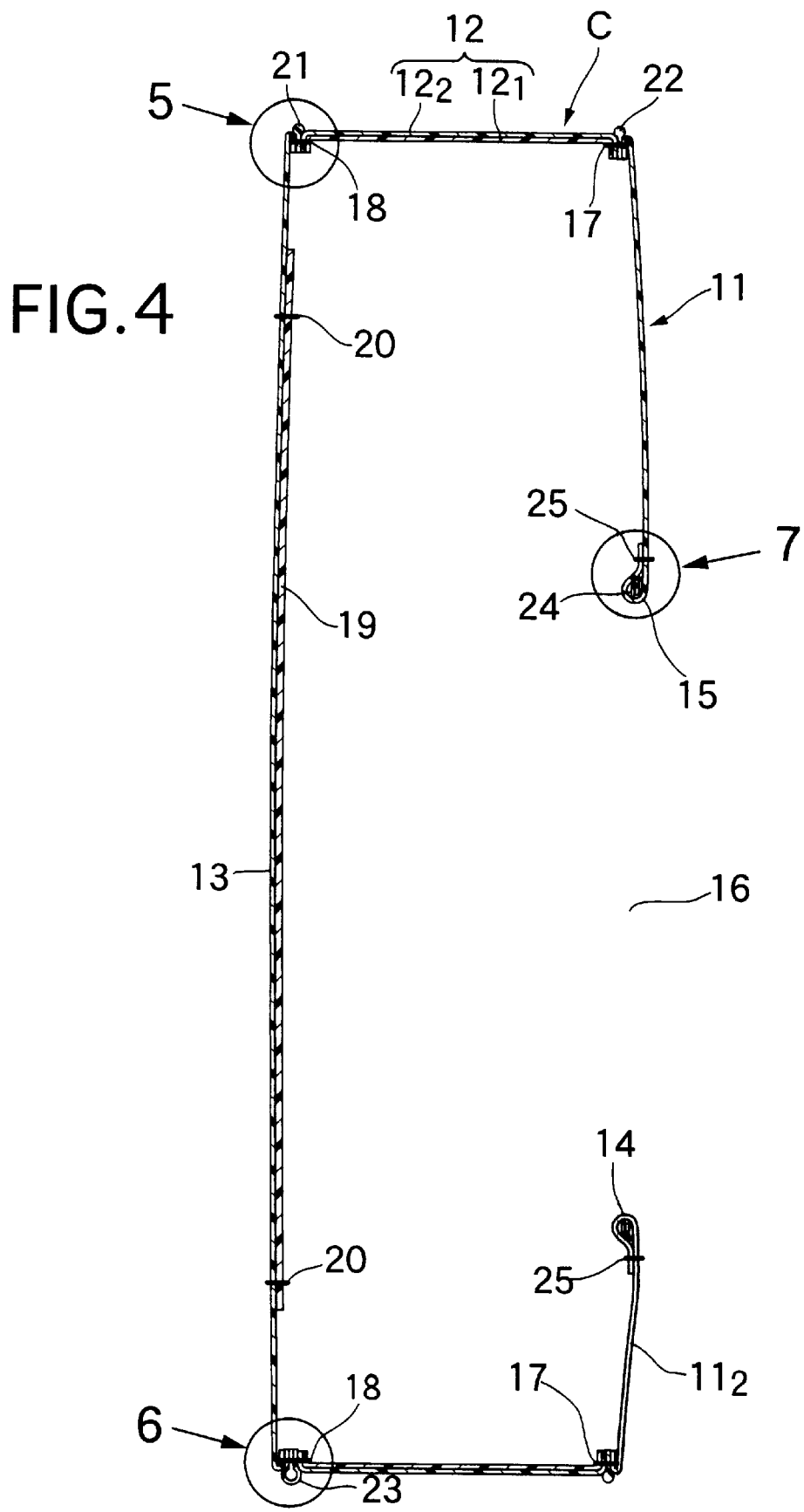
FIG. 4 is a cross-sectional view taken along the line 4—4 shown in FIG. 3.

Referring to FIG. 1, a bracket B is fixed on a lower portion of a rear gate R of a recreational vehicle V to support a spare tire T. The spare tire T supported on the bracket B is covered with a spare tire cover C. As clear from FIGS. 1 and 2, the bracket B includes a pair of left and right mounting flanges 2, 2 each of which is fixed to the rear gate R with two bolts 1, a pair of left and right supporting legs 3, 3 extending backward from the mounting flanges 2, 2, and a spare tire supporting portion 4 connected to rear ends of the supporting legs 3, 3. Four stud bolts 5 are securely fixed backward to the spare tire supporting portion 4. Straight spare tire cover supporting portions $3_1$, $3_1$ (refer to FIG. 2) extending nearly horizontally, viewed from the rear side of a vehicle, are formed on the upper surface of the supporting legs 3, 3 of the bracket B.

The spare tire T includes a tire body 6 and a wheel 7. The spare tire T is securely fixed to the bracket B by inserting the four stud bolts 5 into four bolt holes 8 formed in the wheel 7 and then tightly fastening them with nuts (not shown). With the spare tire T fixed to the bracket B, the pair of supporting legs 3, 3 and the spare tire supporting portion 4 of the bracket B are inserted into a recessed portion of the wheel 7.

Next, the structure of the spare tire cover C will be explained below with reference to FIGS. 2 to 7.

A main portion of the spare tire cover C is made by seaming a first sheet portion 11, a second sheet portion 12 and a third sheet portion 13, each being formed of a vinyl leather. The external shape of the first sheet portion 11 is round and has a diameter substantially equal to that of the spare tire T. An opening 16 is formed at the center portion of the first sheet portion 11 so as to be surrounded by a lower arc portion 14 and an upper straight portion (positioning portion) 15. The second sheet portion 12 is a two-ply sheet formed of a band-like inner sheet $12_1$ and a band-like outer sheet $12_2$, each having substantially the same width as a tread width of the spare tire T. One side fringe of the second sheet portion 12 is connected with a fringe of the first sheet portion 11 at a sewed portion 17. The external shape of the third sheet portion 13 is round and has substantially the same diameter as that of the spare tire T. Another side fringe of the second sheet portion 12 is connected with a fringe of the third sheet portion 13 at a sewed portion 18. At a sewed portion 20, a polypropylene plate 19 formed in a round shape is bonded on an internal surface of the third sheet portion 13. Thus, the plate 19 prevents the third sheet portion 13 (being the most prominent portion) from being wrinkled.

Figure 5:
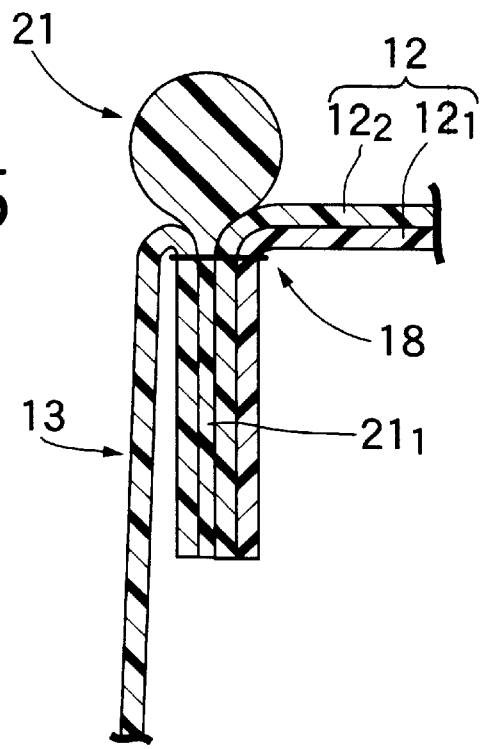
FIG. 5 is an enlarged view showing the portion 5 shown in FIG. 4.
Figure 6:
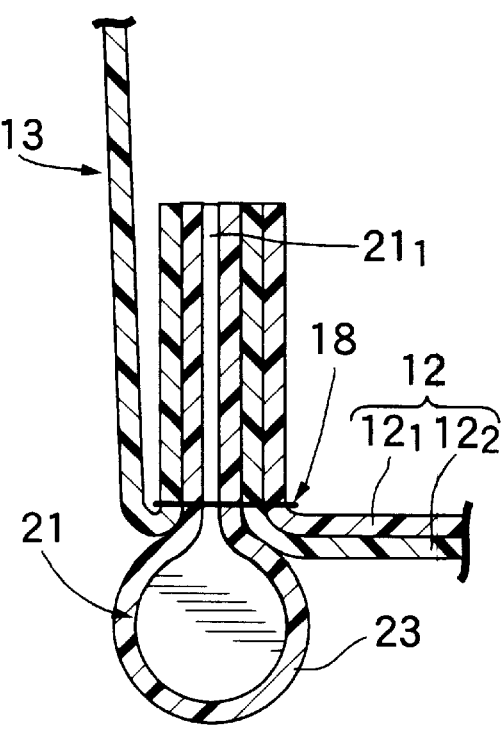
FIG. 6 is an enlarged view showing the portion 6 shown in FIG. 4.
Figure 7:
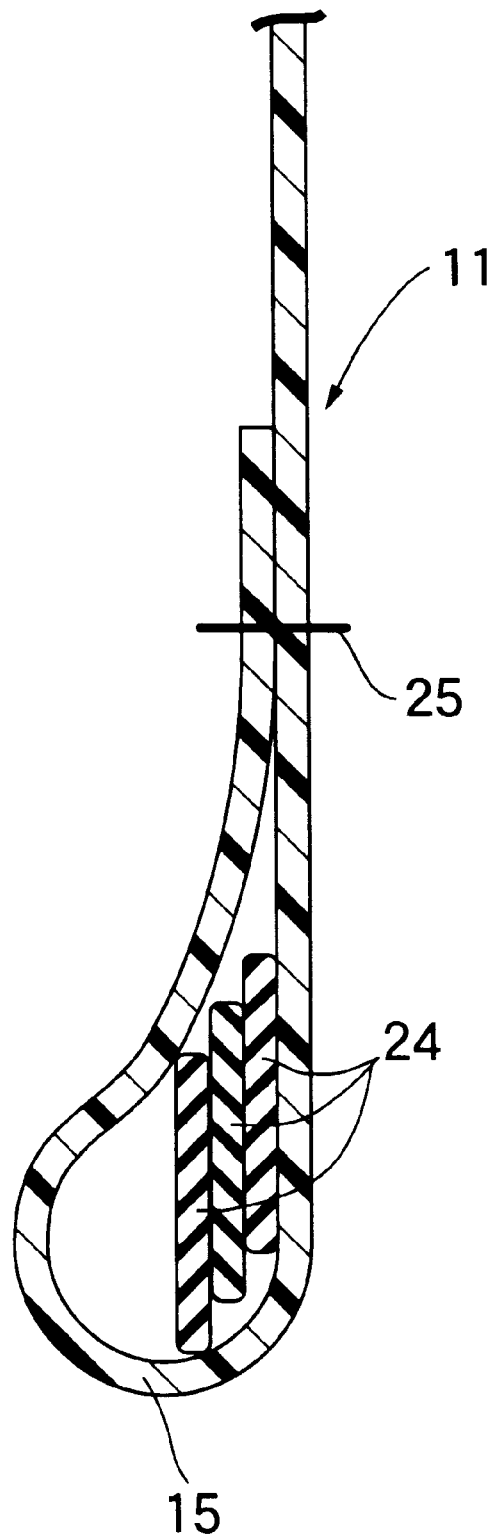
FIG. 7 is an enlarged view showing the portion 7 shown in FIG. 4A.

FIG. 5 shows a structure adjacent to the sewed portion 18. The inner sheet $12_1$ and the outer sheet $12_2$ in the second sheet portion 12, the third sheet portion 13, and a fringe $21_1$ of a beading 21 are laminated and sewed in four layers. Similarly, a beading 22 is attached at the sewed portion 17 formed of the first sheet portion 11 and the second sheet portion 12. Both ends of the beading 21 are butted and connected at the lower end of the third sheet portion 13. However, in order to reinforce the connection portion of the beading 21 at the lower end of the third sheet portion 13, a trim end 23 made of two folded vinyl leathers is wound around the beading 21, as shown in FIG. 6. Sewing is performed with both ends sandwiched between the second sheet portion 12 and the third sheet portion 13.

The first sheet portion 11 includes two slits $11_1, 11_1$ extending outward and in the radius direction from both ends of the straight portion 15 of the opening 16, and one slit $11_2$ extending outward and in the radius direction from the lower end of the arc portion 14. As understood clearly from FIG. 7, the arc portion 14 and the straight portion 15 forming the fringe or peripheral edge of the opening 16 are inwardly folded back and three loop-like elastic bands 24 are accommodated in the folded portion. In such a state, sewing is performed to form a sewing portion 25.

Next, the functionality of an embodiment with the above-mentioned structure according to the present invention will be described below.

In order to attach the spare tire cover C to the spare tire T supported by the bracket B of the rear gate R, the opening 16 in the first sheet portion 11 is opened while the elastic bands 24 are being first widened. The spare tire T is passed through the opening 16 so that the spare tire cover C is attached on the spare tire T. In this case, since three slits $11_1$, $11_1$, $11_2$ are radially formed in the first sheet portion 11, the opening 16 can be easily opened.

When the spare tire cover C is attached to the spare tire T, the first sheet portion 11 covers one side surface of the spare tire T while the bracket B is inserted into the opening 16. The second sheet portion 12 covers the outer peripheral surface (tread surface) of the spare tire T while the third sheet portion 13 covers the other side surface of the spare tire T. Since the opening 16 is biased by the resilient force of the three elastic bands 24 in its shrinking direction, the inner surface of the spare tire cover C comes in close contact with the outer surface of the spare tire T. Thus, the spare tire cover C is stably attached without any wrinkle.

With the spare tire cover C thus attached, since the straight portion 15 forming the upper fringe of the opening 16 of the first sheet portion 11 comes in contact with the upper portion of the horizontal and straight spare tire cover supporting portions $3_1$, $3_1$ formed on the bracket B at the upper position, the spare tire cover C is positioned in the rotational direction, thus being always attached in the same posture. As a result, a logotype printed on the third sheet portion 13 (refer to FIGS. 1 and 3) is maintained horizontally with no tilt so that a properly balanced appearance can be achieved.

Since the portion above the straight portion 15 of the first sheet portion 11 is seen through a rear glass G (refer to FIG. 1) in an automobile, the appearance of the back of the spare tire cover C is highly noticeable. If the fringe around the opening 16 is round, the resilient force of the elastic bands 24 causes radial wrinkles on the upper portion of the first sheet portion 11, thus spoiling the appearance of the spare tire cover C through the rear glass G. However, according to the embodiment of the present invention, the upper fringe of the opening 16 is formed of the straight portion 15. Moreover, since two slits $11_1$, $11_1$ separate off the arc portion $11_2$, only the simple downward tension is effected on the first sheet portion 11 adjacent to the straight portion 15. Hence, since occurrence of wrinkle is prevented in the upper portion of the opening 16, the appearance is improved.

A preferred embodiment of the present invention has been described in detail above. However, various modifications in design can be performed without departing the scope of the present invention.

For example, the materials of the first to third sheet portions 11 to 13 should not be limited only to those described above. Other suitable materials can be selected. In the present invention, the resilient member such as the elastic band 24 is not always needed. The opening 16 may be widened by using the slit formed in the first sheet portion 11 to be opened and closed with a slide fastener.

With the present invention described above, a positioning portion 15 is formed in the opening 16 to be contacted with the upper surface $3_1$ of the bracket B. Hence, the positional relationship between the opening 16 and the bracket B is unchanged so that the spare tire cover C is positioned in the properly balanced rotational direction. This allows the spare tire cover to be always set in a fixed attitude and with a good appearance.

Moreover, the positioning portion 15 is straight and is in contact with a straight spare tire cover supporting portion $3_1$ horizontally formed on the upper surface of the bracket B. Hence, the contact between the straight positioning portion 15 and the straight spare tire cover supporting portion $3_1$ allows the spare tire cover C to be positioned more accurately.

Furthermore, a slit $11_1$ is formed so as to extend outward and in the radial direction from both ends of the positioning portion 15. A resilient member 24 fitted along the fringe of the opening 16 biases the opening 16 in the shrinkable direction. Hence, the slit $11_1$ facilitates widening the opening 16 so that the spare tire cover C can be easily attached and removed. Moreover, the resilient member 24 allows the spare tire cover C to closely contact with the spare tire T, thus stabilizing the attached condition. The synergy between the straight positioning portion 15 and the slit $11_1$ allows the resilient member 24 to provide a simple downward tension to the portion above the spare tire cover C of the positioning portion 15. As a result, since the portion does not wrinkle, its appearance can be improved.

What is claimed is:

1. A spare tire cover for an automobile which covers a spare tire supported on a bracket mounted on an outer wall surface of the automobile, said spare tire cover comprising:

an opening through which the bracket is adapted to pass;

a straight positioning portion formed in said opening for contact with a straight spare tire cover supporting portion horizontally formed on an upper surface of said bracket;

slits extending radially outward from both ends of said straight positioning portion; and a resilient member fitted along a fringe of said opening to bias said opening in a shrinking direction toward a center of said opening.

2. A spare tire assembly for an automobile, comprising:

a bracket adapted to be mounted on an outer wall surface of the automobile to support a spare tire, said bracket having a straight spare tire cover supporting portion horizontally formed on an upper surface of said bracket; and a spare tire cover having:
- an opening through which said bracket passes;
- a straight positioning portion defining an upper portion of said opening and being aligned by contact with said straight spare tire cover supporting portion of said bracket;
- slits extending radially outward from both ends of said straight positioning portion; and
- a resilient member fitted along a fringe of said opening to bias said opening in a shrinking direction toward a center of said opening.

* * * * *